(12) United States Patent
Suzuki et al.

(10) Patent No.: US 8,123,117 B2
(45) Date of Patent: Feb. 28, 2012

(54) PROXIMITY CARD FUNCTION CONTENT DISTRIBUTION SYSTEM AND PROXIMITY CARD FUNCTION CONTENT DISTRIBUTION METHOD

(75) Inventors: Hiroyuki Suzuki, Tokyo (JP); Yasushi Imai, Saitama (JP); Taro Sasada, Kawasaki (JP); Masato Shibata, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 594 days.

(21) Appl. No.: 12/162,719

(22) PCT Filed: Jan. 31, 2007

(86) PCT No.: PCT/JP2007/051588
§ 371 (c)(1),
(2), (4) Date: Aug. 22, 2008

(87) PCT Pub. No.: WO2007/088883
PCT Pub. Date: Aug. 9, 2007

(65) Prior Publication Data
US 2008/0314975 A1    Dec. 25, 2008

(30) Foreign Application Priority Data
Jan. 31, 2006    (JP) .................................. 2006-021929

(51) Int. Cl.
*G06F 17/00* (2006.01)
(52) U.S. Cl. ..................................................... 235/375

(58) Field of Classification Search ................... 235/375, 235/472.01–472.03
See application file for complete search history.

(56) References Cited

U.S. PATENT DOCUMENTS

| 2002/0004762 A1 | 1/2002 | Izumoto |
| 2004/0027619 A1 | 2/2004 | Sato et al. |
| 2004/0132437 A1 * | 7/2004 | Ohmori et al. ............. 455/414.1 |

FOREIGN PATENT DOCUMENTS

| JP | 10-003521 | 1/1998 |
| JP | 2002-024464 | 1/2002 |
| JP | 2002-318873 | 10/2002 |
| JP | 2003-036476 | 2/2003 |
| JP | 2003-296233 | 10/2003 |
| JP | 2004-094918 A | 3/2004 |
| JP | 2004-302770 | 10/2004 |
| JP | 2005-157688 A | 6/2005 |
| JP | 2006-072956 | 3/2006 |

\* cited by examiner

*Primary Examiner* — Jamara Franklin
(74) *Attorney, Agent, or Firm* — Michaud-Kinney Group LLP

(57) ABSTRACT

In a proximity card function content distribution system of the invention, an IP-side apparatus 5 adds identification information of a user to simplified data of contents for the proximity card function, a mobile terminal 1A acquires the simplified data from the IP-side apparatus 5, and distributes the simplified data to another mobile terminal 1B, and when the another mobile terminal 1B performs proximity card communication with a R/W of the IP-side apparatus 5, the another mobile terminal 1B checks whether the terminal 1B has the specific simplified data, and communicates the checking information.

4 Claims, 8 Drawing Sheets

| | URL | IP ORIGINAL ID |
|---|---|---|
| 1 | http://www.test.co.jp/test_54.trc | 0454658769 |
| 2 | http://www.test.co.jp/test_598.trc | 5654658769 |
| 3 | http://www.test.co.jp/test_689.trc | 0459658769 |
| 4 | http://www.test.co.jp/test_87985.trc | 0854658769 |
| 5 | http://www.test.co.jp/test_89565.trc | 1254658769 |

(a)

| | COUPON TYPE | DETAILS OF DISCOUNT |
|---|---|---|
| 1 | 54 | 10-PERCENT DISCOUNT IN AUGUST |
| 2 | 59 | A FREE BEER IN AUGUST |
| 3 | 89 | A FREE BEER IN APRIL |

(b)

| | AFFILIATE ID | NAME |
|---|---|---|
| 1 | 658769 | A |
| 2 | 658568 | B |
| 3 | 658965 | C |

FIG. 6

PROXIMITY CARD FUNCTION CONTENT DISTRIBUTION SYSTEM AND PROXIMITY CARD FUNCTION CONTENT DISTRIBUTION METHOD

CROSS-REFERENCE TO RELATED APPLICATIONS

The present application is based on Japanese Patent Application No. 2006-21929 filed on Jan. 31, 2006, entire content of which is expressly incorporated by reference herein.

TECHNICAL FIELD

The present invention relates to a proximity card function content distribution system and proximity card function content distribution method, and more particularly, to a system and method for distributing contents for proximity card function with ease using a mobile terminal apparatus equipped with the proximity card function.

BACKGROUND ART

With mobile terminal apparatuses becoming more sophisticated, occasions have increased where various data is acquired using the mobile terminal apparatus. In general, the contents are downloaded via the Internet through packet networks and the like. Further, some kind of data can be transmitted and received while being attached to an e-mail. Furthermore, the data has been transmitted and received recently using infrared communication or two-dimensional bar-codes.

In recent years, mobile terminal apparatuses equipped with the IC card function have been in widespread use. The delivery and receipt of data using the IC card function is capable of being performed even with the power on the mobile terminal apparatus side shut off, or performed only by being held over an external R/W, and thus is very easy for users to operate (Patent Document 1). Patent Document 1: Japanese Laid-Open Patent Publication No. 2003-296233

When such an IC card function enables delivery and receipt of data to be achieved, the data obtained with the IC card function can be used in various cases. However, in the conventional system, the data thus obtained with the IC card function is not assumed to be used in various cases, and such a mechanism has currently not been constructed.

SUMMARY

It is an object of the invention to provide a proximity card function content distribution system and proximity card function distribution method enabling the data obtained with the IC card function to be used in various cases.

A system for distributing contents for proximity card function of the invention has an information provider apparatus having a first storing section that stores content data of contents for the proximity card function provided with identification information of users, and a reader/writer section that performs proximity card communication, and a mobile terminal apparatus having a second storing section that stores the content data acquired from the information provider apparatus, a managing section which checks whether specific content data is stored in the storing section and outputs the checking information, and a proximity card communication section that transmits the checking information to the information provider apparatus by proximity card communication.

According to this configuration, the content data of contents for the proximity card function includes the identification information added uniquely by the information provider, and it is thereby possible to grasp the distribution status of the content data based on the identification information of the content data obtained by the proximity card function, and to specify the person of introduction as a distribution source. Accordingly, it is possible to use the data acquired with the proximity card function in various cases.

In the system for distributing contents for proximity card function of the invention, the specific content data is preferably acquired from another mobile terminal apparatus except the mobile terminal apparatus.

In the system for distributing contents for proximity card function of the invention, the information provider apparatus preferably performs affiliate processing on a user associated with the identification information included in the specific content data.

A method for distributing contents for proximity card function of the invention has the steps of in an information provider apparatus adding identification information of a user to content data of contents for the proximity card function, in a mobile terminal apparatus acquiring the content data from the information provider apparatus, in the mobile terminal apparatus distributing the content data to another mobile terminal apparatus, and in the another mobile terminal apparatus checking whether the another mobile terminal apparatus has specific content data to communicate the checking information in performing proximity card communication with a reader/writer section of the information provider apparatus.

According to this method, the content data of contents for the proximity card function includes the identification information added uniquely by the information provider, and it is thereby possible to grasp the distribution status of the content data based on the identification information of the content data obtained by the proximity card function, and to specify the person of introduction as a distribution source. Accordingly, it is possible to use the data acquired with the proximity card function in various cases.

In the method for distributing contents for proximity card function of the invention, in the information provider apparatus, affiliate processing is preferably performed on a user associated with the identification information included in the specific content data.

BRIEF DESCRIPTION OF DRAWINGS

FIG. 4(a) is a view showing a data configuration, and FIG. 4(b) is a view to explain ID information;

FIGS. 6(a) and 6(b) are views showing tables in the IP-side apparatus shown in FIG. 1;

DETAILED DESCRIPTION

Figure 1:
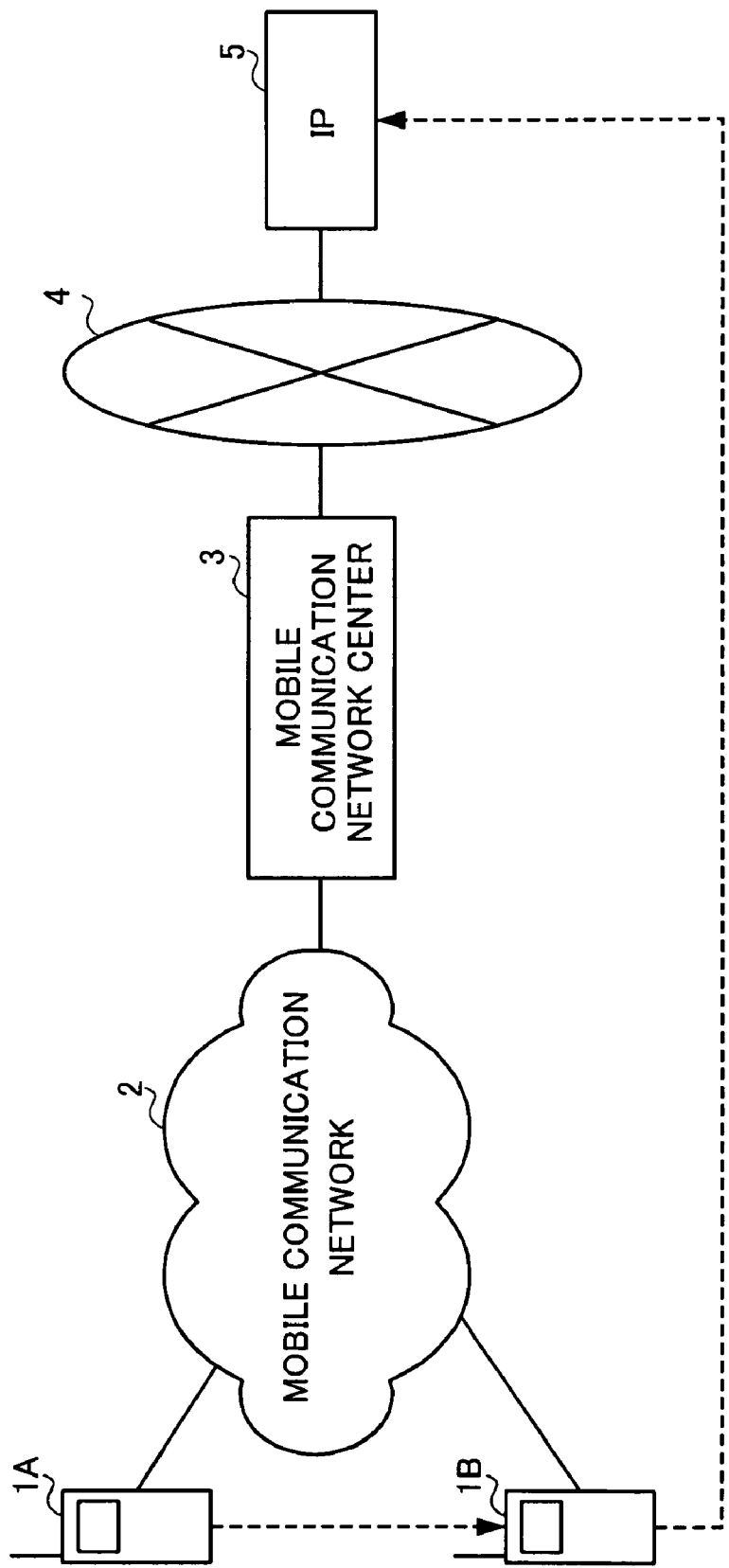
FIG. 1 is a diagram illustrating a schematic configuration of a proximity card function content distribution system according to an embodiment of the invention.

An embodiment of the invention will specifically be described below with reference to accompanying drawings. This embodiment describes the case of applying a proximity card function content distribution system to an affiliate program. In addition, in this embodiment, the content data includes simplified data and main-body data associated with the simplified data. FIG. 1 is a diagram illustrating a schematic configuration of the proximity card function content distribution system according to an embodiment of the invention.

The system as shown in FIG. 1 is mainly comprised of mobile terminals 1A and 1B, a mobile communication network center 3 connected with the mobile terminals 1A and 1B via a mobile communication network 2, and an information provider (IP) apparatus 5 connected with the mobile communication network center 3 via a network such as the Internet 4.

The mobile terminals 1A and 1B are provided with the function of executing the proximity card function, and are capable of transmitting and receiving information by proximity card communication to/from an external reader/writer (R/W) of the IP-side apparatus 5. Further, the mobile terminals 1A and 1B have an operating system (mobile OS), and the browser function, viewer function, JAM (Java Application Manager) and other functions operate on the mobile OS.

The mobile communication network 2 is a network between the mobile terminals 1A and 1B and the mobile communication network center 3. The mobile communication network 2 includes mobile packet communication networks as well as ordinary mobile communication networks. The mobile communication network center has, for example, an i mode (registered trademark) server, serves the gateway function of connecting the mobile communication network 2 and Internet 4, and more particularly, has the information distribution function, mail transmission/reception function, mail storage function, contract customer management function, information provider management function and information fee charging function. The network includes the Internet 4 and other networks such as LAN, WAN and the like, for example.

In the proximity card function content distribution system with such a configuration, the IP-side apparatus 5 adds identification information of a user to the simplified data of contents for the proximity card function, the mobile terminal 1A acquires the simplified data from the IP-side apparatus 5, the mobile terminal 1A distributes the simplified data to another mobile terminal 1B, and when the another mobile terminal 1B performs proximity card communication with a R/W of the IP-side apparatus 5, the another mobile terminal 1B checks whether the terminal 1B has the specific simplified data, and communicates the checking information.

Further, the mobile terminals 1A and 1B are capable of acquiring the simplified data of contents for the proximity card function from the outside. In this case, after detecting a carrier of the external R/W, the mobile terminals 1A and 1B start communication between the R/W in the proximity card function section and the external R/W, and obtains the simplified data from the external R/W. Further, by connecting to the URL contained in the simplified data, the terminals are capable of downloading the main-body data of the contents for the proximity card function associated with the simplified data.

Figure 2:
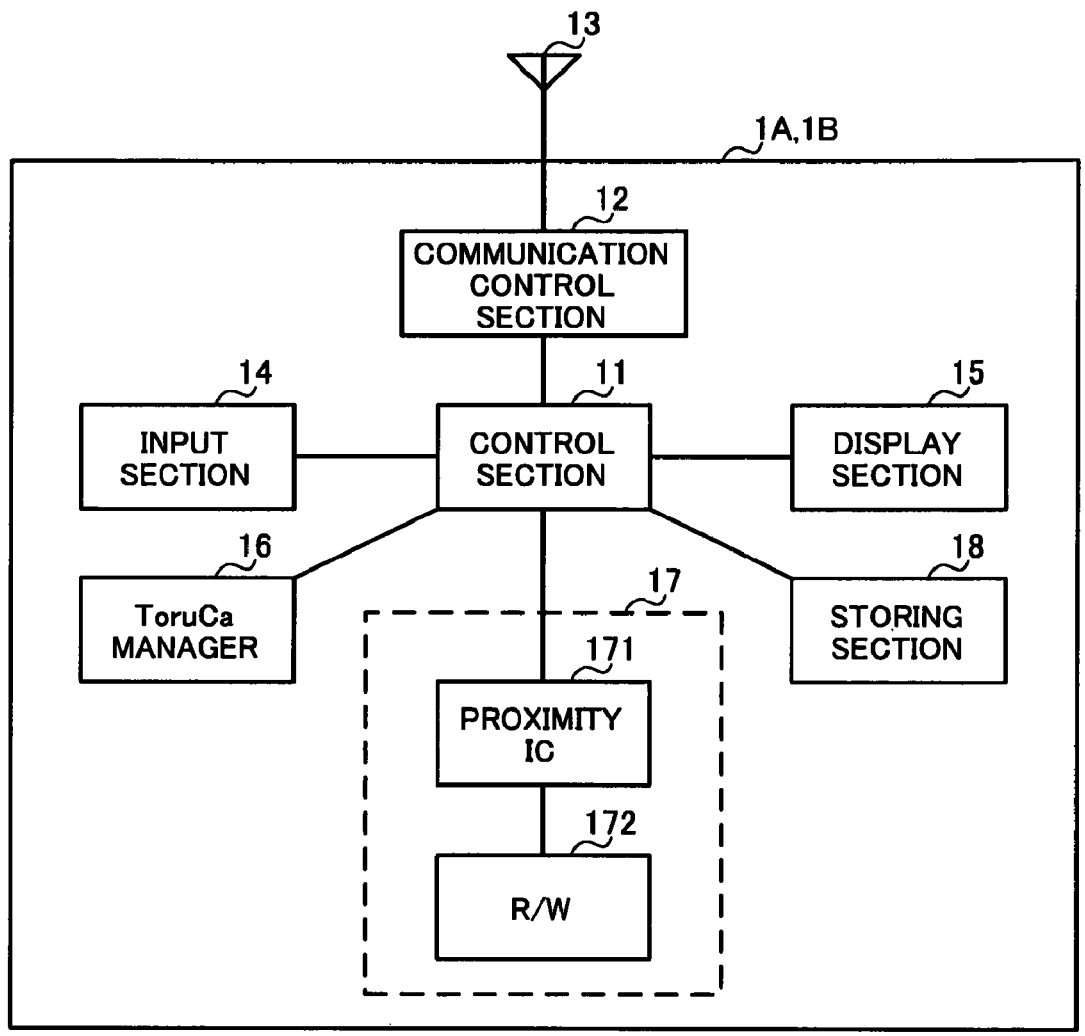
FIG. 2 is a block diagram illustrating a schematic configuration of a mobile terminal in the proximity card function content distribution system shown in FIG. 1.

FIG. 2 is a block diagram illustrating a schematic configuration of the mobile terminal in the proximity card function content distribution system as shown in FIG. 1. In addition, the configuration as shown in FIG. 2 is simplified to explain the invention, and is assumed to have structural elements installed in a normal mobile terminal. In addition, described herein is the case where contents for the proximity card function are ToruCa contents (including content simplified (snip) data and content-body data).

Each of the mobile terminals 1A and 1B is mainly comprised of a control section 11 that controls the entire apparatus, a communication control section 12 that controls wireless communication via an antenna 13, an input section 14 to input various information and data, a display section 15 that displays various information and data, a ToruCa manager 16 that manages ToruCa data (simplified data and main-body data) that is content data for the proximity card function, a proximity card section 17 that performs proximity card communication with an external R/W, and a storing section 18 that stores ToruCa snip data. The proximity card section 17 includes a buffer to buffer the ToruCa snip data that is the simplified data and other information, a proximity IC 171 including a controller to achieve the proximity card function, and a R/W 172 that performs proximity card communication with the external R/W.

The communication control section 12 performs control on wireless communication with other mobile terminals and another communication apparatus, and the like. For example, the communication control section 12 receives radio signals from the antenna 13, while transmitting signals to transmit to other mobile terminals and another communication apparatus via the antenna 13. Further, the communication control section 12 has the browser function and mailer function. Accordingly, the communication control section 12 connects to a URL included in the ToruCa snip data to access and obtain the ToruCa-body data, and downloads the ToruCa-body data. Further, the communication control section 12 is capable of downloading the ToruCa-body data from the website by the browser function. Furthermore, the communication control section 12 has the function of linking to a website from a URL included in the ToruCa-body data, the function of placing a call from a telephone number included in the ToruCa-body data, and the function of transmitting an e-mail from a mail address included in the ToruCa-body data. Moreover, the Java (registered trademark) application and browser perform communication via the communication control section 12, using a command required for the communication, for example, API (Application Program Interface), and when the content data is contained in the application, are capable of reading the content data to deliver to another application, while when a URL is described, being capable of gaining access to a predetermined website based on the URL to obtain the ToruCa data. In addition, the communication control section 12 may be provided with a configuration for supporting infrared communication, Bluetooth communication or the like.

Figure 8:
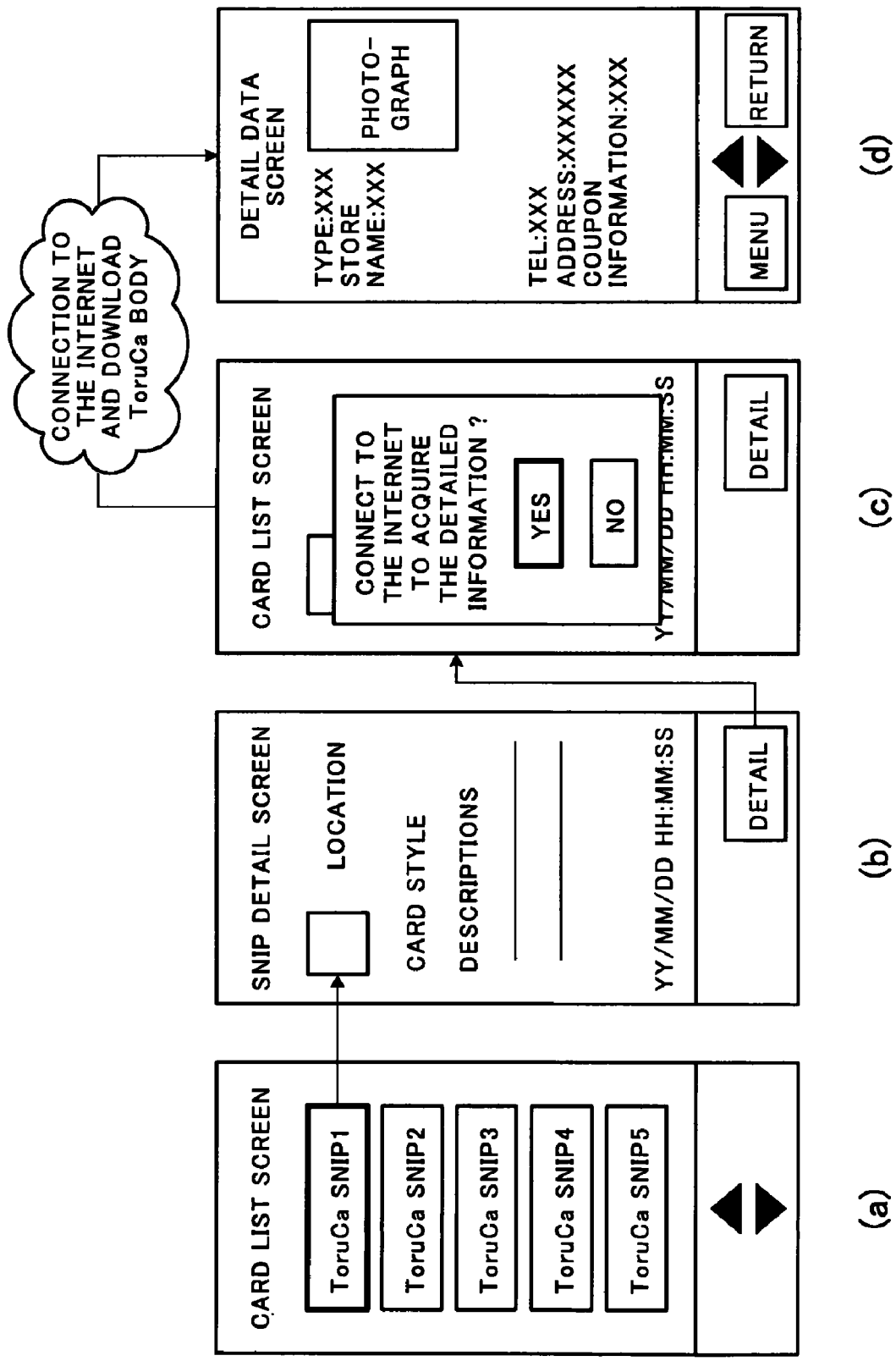
FIG. 8 is a view to explain materialization of ToruCa contents.
Figure 9:
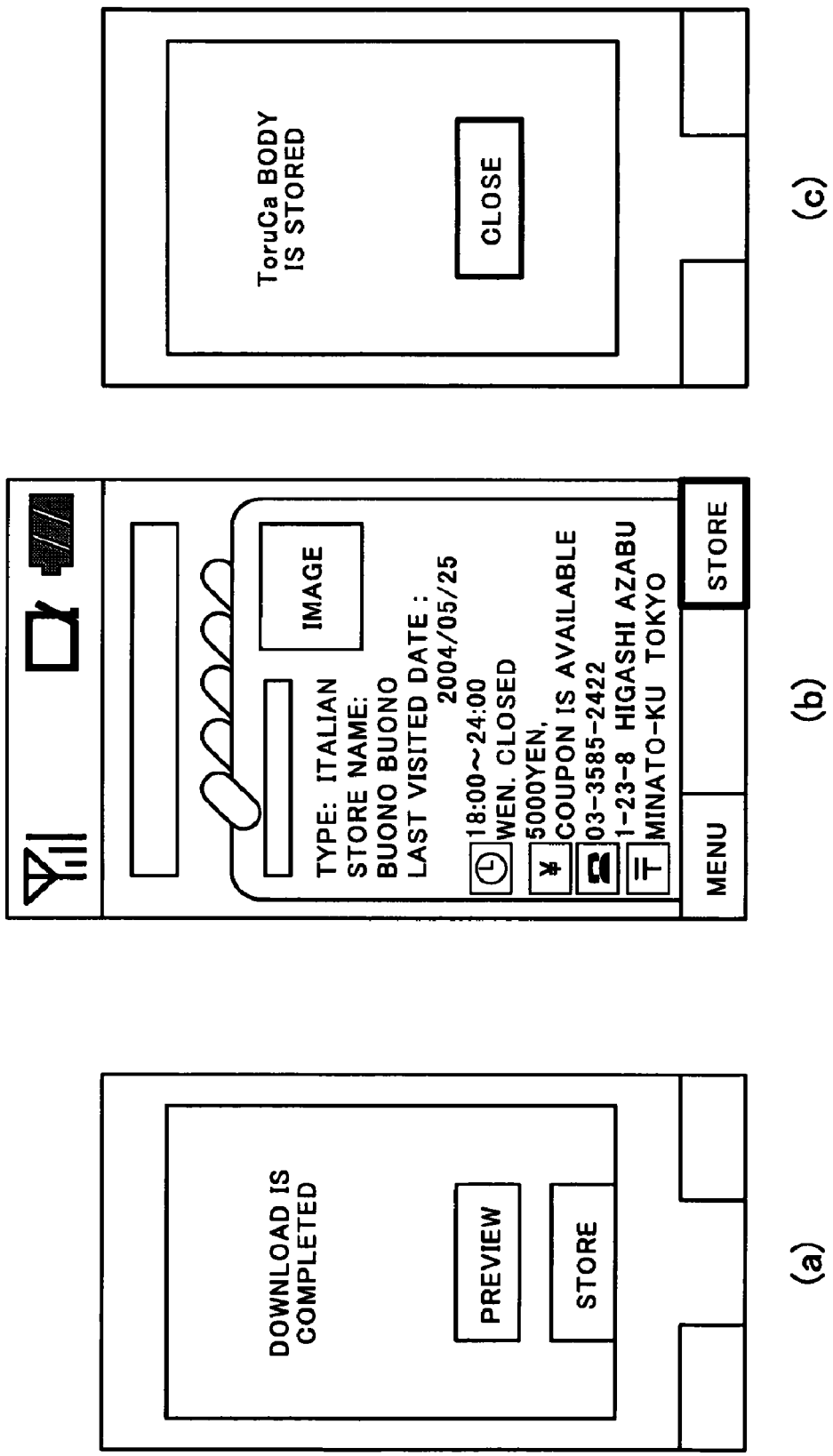
FIG. 9 is a view showing screen display examples in downloading ToruCa-body data.

The display section 15 has the viewer function, and displays the acquired ToruCa data. Further, the display section 15 formats the ToruCa data to a predetermined display format (for example, format as shown in FIGS. 8 and 9 described later) to display. The ToruCa snip data is displayed in a layout as shown in FIG. 8(*b*), for example. In this layout is indicated information about a place, title and the like, and brief explanation on the title. The brief explanation includes a URL to access to obtain the ToruCa-body data, and the like. Meanwhile, the ToruCa-body data is displayed in a layout as shown in FIG. 9(b). Also in this layout is indicated information about a place, title and the like, and detail explanation on the title. The detail explanation includes a related-link URL, telephone number, mail address and the like.

The storing section 18 stores ToruCa snip data. For example, the storing section 18 stores the ToruCa snip data to be extracted easily by folder management. Herein, the ToruCa snip data that is the content simplified data has a data configuration as shown in FIG. 4(a). The ToruCa snip data contains ID information and control flags. The ID information is identification information added uniquely by the IP. For example, as shown in FIG. 4(b), the ID information has the identification information (store ID) of a store of the IP, type of coupon, and identification information (affiliate ID) of an affiliate program in the IP. In addition, the ID information as shown in FIG. 4(b) is an example, and description of the information are capable of being modified in various manners.

The ToruCa snip data contains control flags. Among the control flags are a flag on whether redistribution of the ToruCa snip data is permitted or not, a flag on where a copy of the data is permitted or not, a flag on whether reading of the ToruCa-body data is permitted or not, and the like. The control flags are examples, and another control flag may be used.

Figures 4, 5:
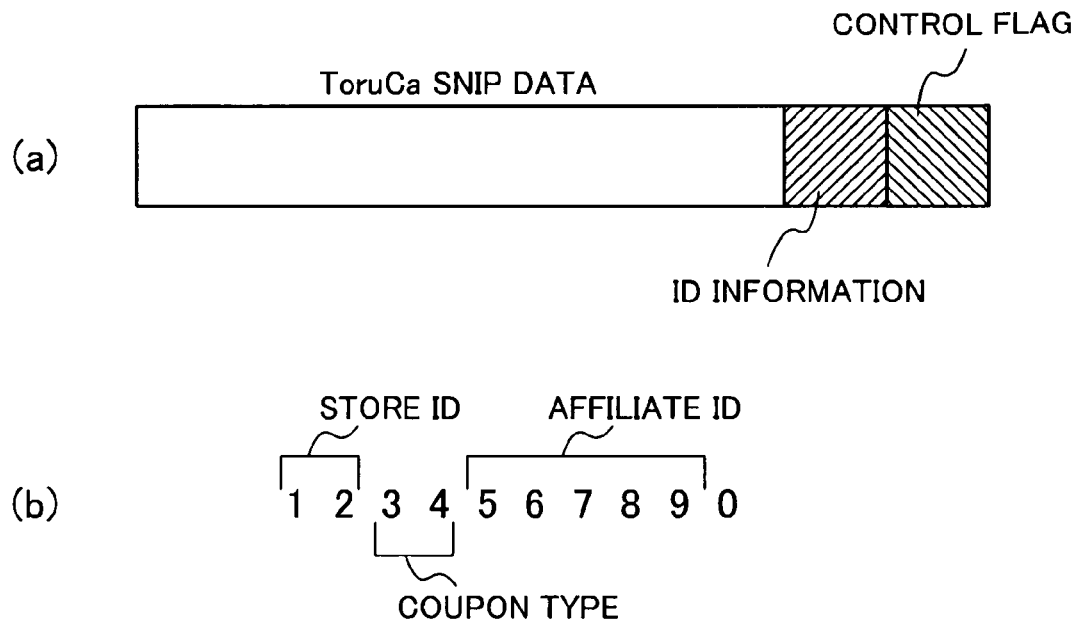
FIG. 4 contains views showing ToruCa snip data used in the proximity card function content distribution system according to the embodiment of the invention, where
FIG. 5 is a view showing a table in the mobile terminal shown in FIG. 1.

In performing proximity card communication in the proximity card section 17, the ToruCa manager 16 performs control of checking whether specific ToruCa snip data exists or not when the external R/W inquires whether the terminal has the specific ToruCa snip data, and communicating the checking information to the external R/W. The ToruCa manage 16 has a table as shown in FIG. 5. In the table, an URL to access in acquiring the ToruCa-body data is associated with ID assigned uniquely by the IP for each ToruCa snip data. Accordingly, when the external R/W inquires whether the terminal has the specific ToruCa snip data, the ToruCa manager 16 performs control of referring to the table as shown in FIG. 5 to check whether the specific ToruCa snip data exists, and when the specific ToruCa snip data exists, extracting the ToruCa snip data stored in the storing section 18 to transmit to the external R/W. Further, when the ToruCa snip data is acquired from an external R/W by proximity card communication, the ToruCa manager 16 stores the ToruCa snip data in the storing section 18.

For example, the proximity card section 17 adds the ToruCa snip data by the proximity card function, and the like. Examples of the proximity card function include FeliCa (registered trademark) and the like. When the mobile terminal 1A or 1B is held over the external R/W, the R/W 172 of the proximity card section 17 acquires the ToruCa data and command information from the external R/W to output to the predetermined processing section. The control section 11 has the header identification function, and identifies a header added to the data acquired from the external R/W to output to the predetermined processing section. For example, when the data acquired from the external R/W is the ToruCa snip data, the control section 11 outputs the data to the ToruCa manager 16. Meanwhile, when the data acquired from the external R/W is application startup information, the control section 11 outputs the data to JAM (Java Application Manager, not shown).

Herein, the proximity communication using a proximity card means a communication method including Near Field communication such as transmission and reception of data using infrared communication, two-dimensional bard-code or the like. Further, the proximity card is a module accompanying a mobile terminal to enable the data to be transmitted and receive to/from external apparatuses with ease.

Figure 3:
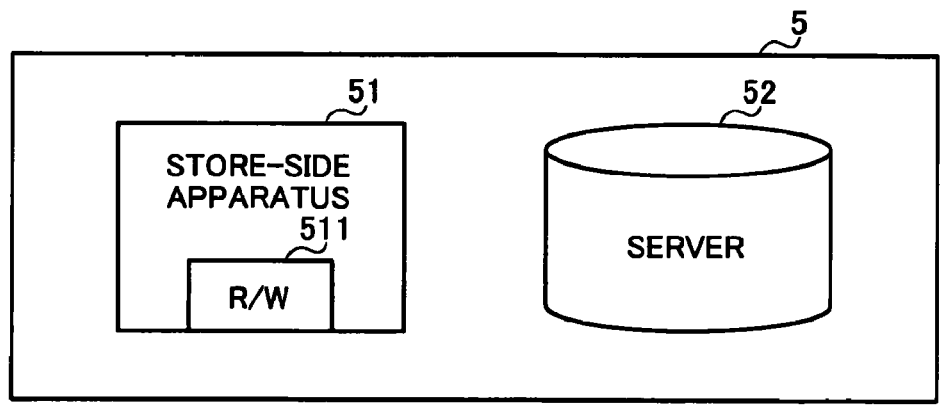
FIG. 3 is a block diagram illustrating a schematic configuration of an IP-side apparatus in the proximity card function content distribution system shown in FIG. 1.

FIG. 3 is a block diagram illustrating a schematic configuration of the IP-side apparatus in the proximity card function content distribution system as shown in FIG. 1. The IP-side apparatus 5 includes a server apparatus 52 that provides a website of the IP, and a store-side apparatus (for example, POS (Point Of Sales) register system) 51 in a store of the IP. The store-side apparatus 51 has a R/W 511. For the IP-side apparatus 51, it is shown in FIG. 1 that the server apparatus 52 and the store-side apparatus 51 exist at the same place, but the server apparatus 52 and the store-side apparatus 51 may exist at difference places. Further, required is a configuration enabling the server apparatus and the store-side apparatus to transmit the information, and the server apparatus and the store-side apparatus may be connected directly using a cable, or may be connected on the network (Internet, or another network).

The store-side apparatus 51 has tables as shown in FIGS. 6(a) and 6(b). The table as shown in FIG. 6(a) manages types of coupons in the ID information of the ToruCa snip data, and the table as shown in FIG. 6(b) manages affiliate ID in the ID information of the ToruCa snip data. In other words, in table as shown in FIG. 6(a), the type of coupon is associated with the contents of discount for each ToruCa snip data, and in the table as shown in FIG. 6(b), the affiliate ID is associated with a user receiving a benefit and reward (service, cashback, point addition or the like) by an affiliate program for each ToruCa snip data. To receive such a benefit and reward by the affiliate program, the user makes registration in advance with the IP. The advance registration is managed in the server apparatus 52 of the IP-side apparatus 5.

Figure 7:
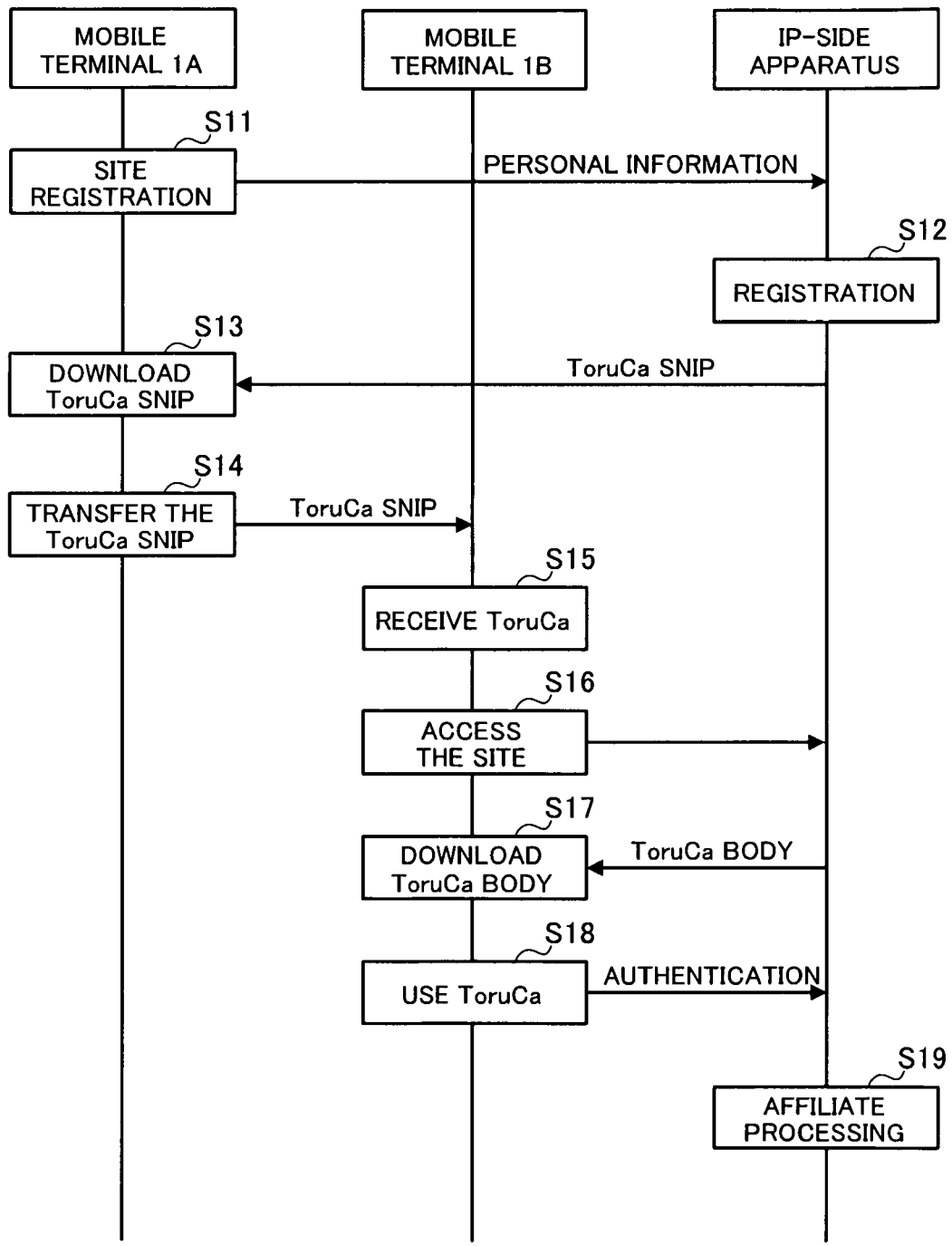
FIG. 7 is a view to explain a proximity card function content distribution method according to the embodiment of the invention.
Figure 10:
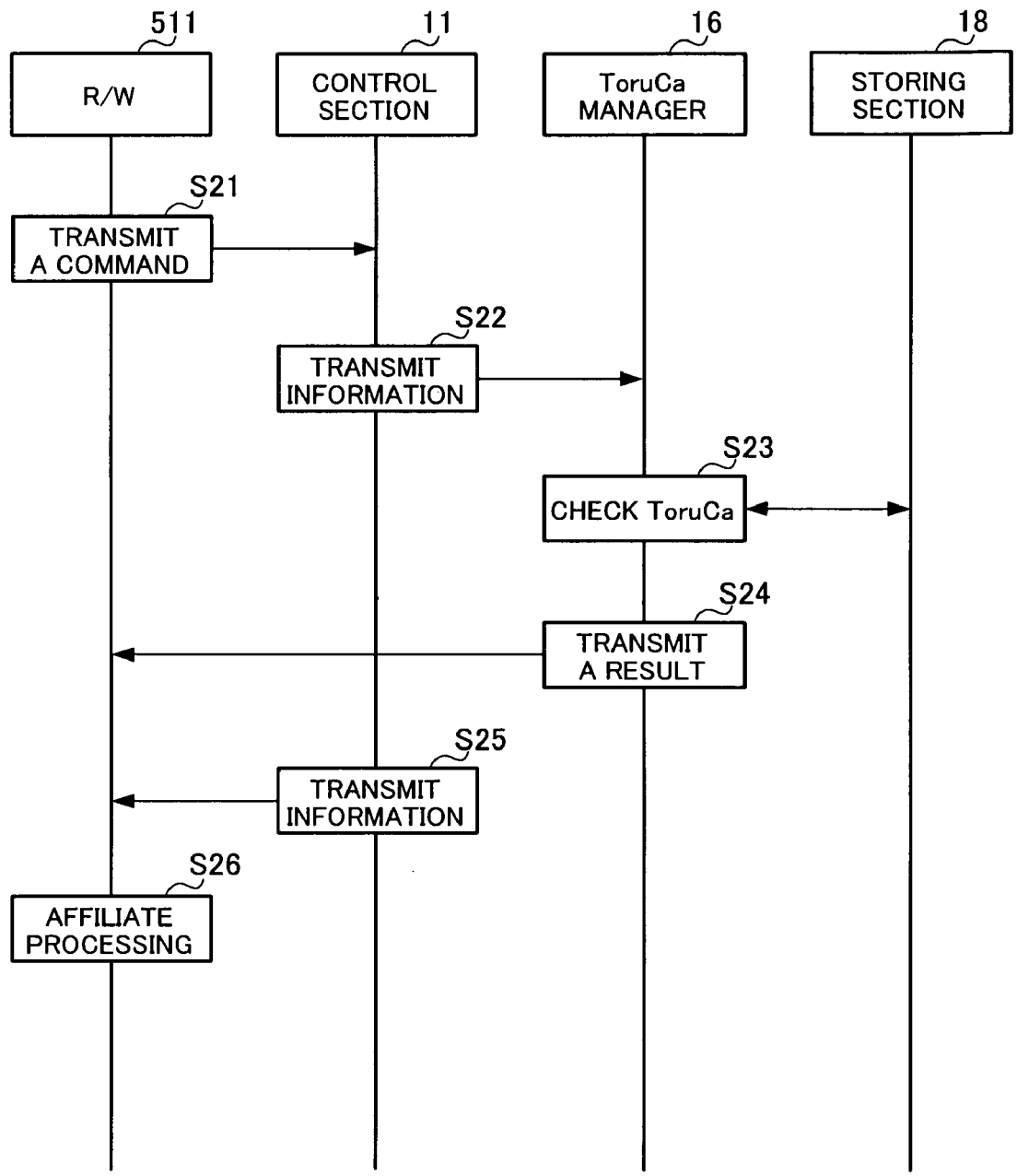
FIG. 10 is a view to explain ToruCa reading procedures in the proximity card function content distribution method shown in FIG. 7.

Referring to FIG. 7, described next is a proximity card function content distribution method according to the embodiment of the invention. Further, FIG. 10 is a view to explain ToruCa reading procedures in the proximity card function content distribution method as shown in FIG. 7.

First, a user A to receive a benefit and reward by an affiliate program accesses the website of the IP to make user registration (S11). In this case, the user connects to the website of the IP in the mobile terminal 1A via the mobile communication network 2 and the Internet 4, displays the website screen in the display section 15, and inputs predetermined personal information in the website. By this means, the IP-site apparatus 5 stores the personal information in the server apparatus 52, i.e. manages the personal information, and makes the user registration (S12). After making the user registration, the IP-side apparatus 5 generates ToruCa snip data including the ID information added originally on the IP side.

After confirming that the user registration is made in the mobile terminal A, the user A downloads the ToruCa snip data including the ID information to acquire (S13). The ToruCa snip data is stored in the storing section 18. The ToruCa snip data is updated in the table of the ToruCa manager 16. By this means, the user A obtains a coupon issued from the IP. In this case, the coupon is not a paper medium, stored in the mobile terminal 1A as the ToruCa snip data, and not bulky. Further, as distinct from electronic coupons, this coupon does not need to be printed and is very convenient.

The user as a person of introduction is capable of distributing the ToruCa snip data that is the coupon to a variety of people. For example, when the user A distributes the ToruCa snip data to a user B, the user A transfers the ToruCa snip data from the mobile terminal 1A to the mobile terminal 1B (S14). In transferring the ToruCa snip data, the R/W of the mobile terminal 1A may be held over the R/W of the mobile terminal 1B, the mobile terminal 1A may transmit an e-mail containing the ToruCa snip data to the mobile terminal 1B, or the mobile terminal 1A may transmit the ToruCa snip data to the mobile terminal 1B using infrared communication or Bluetooth communication.

When the user B as a user receives the ToruCa snip data in the mobile terminal 1B (S15), the ToruCa snip data is stored in the storing section 18, and the table of the ToruCa manager 16 is updated. At this point, the user B is capable of acquiring (materializing) more detailed ToruCa-body data than the ToruCa snip data. By this means, the user B is capable of obtaining more detailed information (store information) of the IP. In this case, the user B accesses the website of the IP from the mobile terminal 1B, and downloads the ToruCa-body data via the mobile communication network 2 and the Internet 4 to acquire (S17). In addition, acquisition of the ToruCa-body data is optional, and the ToruCa-body data does not need to be indispensable in the affiliate processing described later.

FIG. 8 is a view to explain materialization of ToruCa contents. Further, FIG. 9 is a view showing screen display examples in downloading the ToruCa-body data. When ToruCa contents are materialized, first, as shown in FIG. 8(a), the user selects a snip to materialize i.e. obtain more detailed information from a list display screen of acquired ToruCa snip data. When the snip is selected, as shown in FIG. 8(b), a detail screen of the snip is displayed. When a "detail" button is pressed in this detail screen, as shown in FIG. 8(c), a confirmation screen is displayed to acquire the ToruCa-body data. When the user selects download in the confirmation screen, the terminal connects to the Internet, accesses the URL included in the ToruCa snip data, downloads the ToruCa-body data, and displays the screen as shown in FIG. 8(d). More specifically, when the download is completed, the screen as shown in FIG. 9(a) is displayed. Then, when the user presses a preview button, the screen including the detail data is displayed as shown in FIG. 9(b). Meanwhile, when the user presses a storage button in the screen as shown in FIG. 9(a), the screen as shown in FIG. 9(c) is displayed.

The user B goes to the store of the IP, and uses the ToruCa data that is a coupon (S18). In other words, by holding the mobile terminal 1B over the R/W 511 in the store-side apparatus 51, authentication is performed between the R/W 511 and the proximity card section 17 of the mobile terminal 1B by proximity card communication. When the authentication is performed in the proximity card communication and validity is certified, the store-side apparatus 51 performs the affiliate processing (S19). By this means, the user A who introduced the store of the IP to the user B is given the benefit and reward (service, cashback, point addition or the like) from the IP. In addition, the aspect of giving the benefit and reward is not limited thereto, and is capable of being modified in various manners.

Referring to FIG. 10, described herein are specific procedures for using the ToruCa data. The R/W 511 of the store-side apparatus 51 always informs an information signal with a predetermined carrier. When the mobile terminal 1B is brought close to the R/W 511, the proximity IC 171 of the proximity card section 17 in the mobile terminal 1B detects the information signal. This information signal is an electromagnetic wave, and the proximity IC 171 is activated by the electromagnetic wave. Then, the R/W 511 issues a command to inquire whether or not the specific ToruCa snip data exists to transmit to the proximity IC 171. The information of the command is output to the control section 11 via the proximity IC 171 (S21). In addition, the presence or absence of the specific ToruCa snip data is based on conditions of right truncation of specific URL (http://www.test.co.jp) and right truncation of ID (04) added uniquely by the IP. The conditions are capable of being modified as appropriate.

Next, the control section 11 outputs the received information to the ToruCa manager 16 (S22). Then, based on the information, the ToruCa manager 16 checks whether the specific ToruCa data exists or not (S23). In other words, by referring to the table as shown in FIG. 5, the ToruCa manager 16 checks whether the ToruCa snip data meeting the conditions of right truncation of specific URL and right truncation of ID added uniquely by the IP exists or not. In the table as shown in FIG. 5, the ToruCa snip data No. 1 and No. 3 meets the above-mentioned conditions (shaded areas in FIG. 5).

Then, the ToruCa manager 16 extracts the ToruCa snip data No. 1 and No. 3 (ID: 0454658769 (No. 1) and ID: 0459658769 (No. 3)) from the storing section 18 to output to the control section 11 as a checking result (S24). Further, the control section 11 transmits the input ToruCa snip data to the R/W 511 of the store-side apparatus 51 via the proximity IC 171 (S25).

Thus, when the mobile terminal 1B performs proximity card communication with the R/W 511, the mobile terminal 1B checks whether the terminal 1B has the specific ToruCa snip data, and communicates the checking information. After the communication, the store-side apparatus 51 performs the affiliate processing based on the checked ID information (S26).

In the affiliate processing in the store-side apparatus 51, the table as shown in FIG. 6(a) is referred to, and the type of coupon of the ID information is checked. By this means, the ToruCa snip data No. 1 has the coupon type of "54", and indicates a 10-percent discount in August, and the ToruCa snip data No. 3 has the coupon type of "59", and indicates a free beer in August (shaded area in FIG. 6(a)). These discounts are benefit by the coupon to the user B who is the user. Further, by referring to the table as shown in FIG. 6(b), the affiliate ID of the ID information is checked. By this means, since the ToruCa snip data No. 1 and No. 3 has the affiliate ID of "658769", and it is understood that Mr./Ms. A is a distribution source (person of introduction) of the ToruCa snip data (shaded area in FIG. 6(b)). Accordingly, Mr./Ms. A is given the benefit and reward. These are benefit and reward to Mr./Ms. A who is a person of introduction.

Thus, in the proximity card function content distribution system according to the invention, the simplified data (ToruCa snip data) of contents for the proximity card function includes the ID (identification information) that is added uniquely by the IP, and it is thereby possible to grasp the distribution status of the simplified data based on the ID of the simplified data obtained with the IC card function, and to specify the person of introduction as a distribution source. Accordingly, it is possible to use the data acquired with the IC card function in various cases.

The present invention is not limited to the aforementioned embodiment, and is capable of being carried into practice in various modifications. For example, the aforementioned embodiment describes the case of applying the proximity card function content distribution system to an affiliate program, but the invention is not limited thereto, and is applicable to all the cases of using the simplified data including the IP original ID information. Further, the affiliate program in the above-mentioned embodiment is an example, and the invention is not limited thereto. The benefit and/or reward may be varied corresponding to the number of distributions and distribution aspect (for example, a person who receives the distribution further distributes the data) of the ToruCa snip data or the number of downloads of the ToruCa-body data.

The above-mentioned embodiment describes the case of using only the ToruCa snip data in authentication between the R/W 511 of the store-side apparatus 51 and the mobile terminal 1B, but the invention is not limited thereto. In authentication between the R/W 511 of the store-side apparatus 51 and the mobile terminal 1B, authentication may be performed using the ToruCa snip data and ToruCa-body data. Alternately, authentication may be performed using key information in addition to the ToruCa snip data and ToruCa-body data.

The above-mentioned embodiment describes about transmission and reception of data using the proximity card, but in the invention, transmission and reception of data using a two-dimensional bar-code may be used. In this case, the R/W in the store-side apparatus converts the ToruCa data into a two-dimensional bar-code to display, and a mobile terminal shoots the bar-code with the camera to store in the mobile terminal. The ToruCa data is thereby written in the mobile terminal. At this point, the two-dimensional bar-code may be decoded and stored.

Further, the R/W in the store-side apparatus converts a command of inquiring whether or not the specific ToruCa snip data exists into a two-dimensional bar-code to display. The mobile terminal shoots the bar-code with the camera, thereby starts the internal application, searches for the ToruCa data stored in the mobile terminal, and displays the result in the mobile terminal. The R/W in the store-side apparatus reads the two-dimensional bar-code displayed in the mobile terminal with a bar-code reader. By this means, the inquiry about the presence or absence of the ToruCa data is made to the mobile terminal.

In the aforementioned example, a command of inquiring whether or not the specific ToruCa data exists is converted into a two-dimensional bar-code and displayed, and the following embodiment can also be implemented. The R/W 511 of the store-side apparatus 51 informs an information signal with a predetermined carrier as in the above-mentioned embodiment. Upon detecting the information signal, the mobile terminal starts the internal application, searches for the ToruCa data stored in the mobile terminal as in the above-mentioned embodiment, and displays the result in the mobile terminal. In this way, when a mobile terminal is provided with the function of receiving the information signal with the predetermined carrier, irrespective of whether the mobile terminal is of the type of supporting the ToruCa data, the same service can be offered.

The present invention is not limited to the configurations described in the above-mentioned embodiment, and is capable of being modified as appropriate in the numeric value of the ID information, layout of character strings and screen display and the like to be carried into practice without departing from the scope of the invention. The above-mentioned embodiment describes the case where the contents for the proximity card function are ToruCa contents, but the invention is similarly applicable to the case where the contents for the proximity card function are contents for the proximity card function other than the Toruca contents. Moreover, the invention is capable of being carried into practice with modifications thereof as appropriate without departing from the scope of the invention.

According to the invention, an information provider apparatus adds identification information of a user to content data of contents for the proximity card function, a mobile terminal apparatus acquires the content data from the information provider apparatus, and distributes the content data to another mobile terminal apparatus, the another mobile terminal apparatus checks whether the another mobile terminal apparatus has the specific content data to communicate the checking information in performing proximity card communication with a reader/writer section of the information provider apparatus, and it is thereby possible to use the data obtained by the proximity card function in various cases.

What is claimed is:

1. A system for distributing contents for proximity card function, comprising:
    an information provider apparatus having a first storing section that stores content data of contents for the proximity card function provided with original identification information, and a reader/writer section that performs proximity card communication; and
    a mobile terminal apparatus having a second storing section that stores the content data acquired from the information provider apparatus via another mobile terminal, a managing section which checks whether specific content data is stored in the second storing section and outputs the checking information, and a proximity card communication section that transmits the checking information to the information provider apparatus by proximity card communication.

2. The system for distributing contents for proximity card function according to claim 1, wherein the information provider apparatus performs affiliate processing on a user associated with the identification information included in the specific content data.

3. A method for distributing contents for proximity card function, comprising:
    in an information provider apparatus adding identification information to content data of contents for the proximity card function;
    in a mobile terminal apparatus acquiring the content data from the information provider apparatus;
    in the mobile terminal apparatus distributing the content data to another mobile terminal apparatus; and
    in the another mobile terminal apparatus checking whether the another mobile terminal apparatus has specific content data to communicate the checking information in performing proximity card communication with a reader/writer section of the information provider apparatus.

4. The method for distributing contents for proximity card function according to claim 3, wherein in the information provider apparatus, affiliate processing is performed on a user associated with the identification information included in the specific content data.

* * * * *